(12) United States Patent  (10) Patent No.: US 6,705,185 B2
Bruggemann  (45) Date of Patent: Mar. 16, 2004

(54) LATHE FOR INTERIOR CUTTING OF HOLLOW WORK PIECES

(75) Inventor: Bernhard Bruggemann, Vreden (DE)

(73) Assignee: Saueressig GmbH & Company, Vreden (DE)

( * ) Notice: Subject to any disclaimer, the term of this patent is extended or adjusted under 35 U.S.C. 154(b) by 0 days.

(21) Appl. No.: 10/078,490

(22) Filed: Feb. 21, 2002

(65) Prior Publication Data

US 2002/0121168 A1 Sep. 5, 2002

(30) Foreign Application Priority Data

Feb. 23, 2001 (DE) .......................... 101 08 698

(51) Int. Cl.[7] .............................. B23B 5/08; B23B 29/00
(52) U.S. Cl. ............................ 82/82; 82/113; 82/1.11; 82/1.2; 82/1.4; 82/1.5
(58) Field of Search ............................ 82/1.11, 1.2, 1.4, 82/1.5, 82, 113; 408/708, 709, 138; 409/225

(56) References Cited

U.S. PATENT DOCUMENTS

| | | | | |
|---|---|---|---|---|
| 3,884,590 A | * | 5/1975 | Skrentner et al. | 408/8 |
| 3,937,110 A | | 2/1976 | Renoux | |
| 4,246,812 A | * | 1/1981 | Gladwin et al. | 409/225 |
| 4,400,859 A | * | 8/1983 | Woythal et al. | 29/27 C |
| 4,856,945 A | | 8/1989 | Bareis | |
| 5,030,041 A | * | 7/1991 | Marron | 82/1.4 |
| 5,106,244 A | * | 4/1992 | Sato | 409/225 |
| 5,609,055 A | * | 3/1997 | Castricum | 72/49 |
| 6,287,057 B1 | * | 9/2001 | Kurz | 408/1 R |
| 6,295,853 B1 | * | 10/2001 | Castricum | 72/49 |
| 6,447,220 B1 | * | 9/2002 | Ricci et al. | 82/1.4 |

FOREIGN PATENT DOCUMENTS

| | | |
|---|---|---|
| DE | 11 17 972 B | 11/1961 |
| DE | 35 32 539 A | 3/1987 |
| GB | 1 200 421 A | 7/1970 |

* cited by examiner

Primary Examiner—Erica Cadugan
Assistant Examiner—Dana Ross
(74) Attorney, Agent, or Firm—Aslan Baghdadi; Shaw Pittman LLP

(57) ABSTRACT

A turning lathe for interior cutting of hollow work pieces using a boring rod onto which a tool holder device is fitted and on which there is a mechanism for holding a work piece in such a way that it encloses at least part of the boring rod characterized by the fact that the boring rod is gripped and held in place at both ends and by the fact that the tool holder device is fitted onto the boring rod in such a way that it is movable.

16 Claims, 2 Drawing Sheets

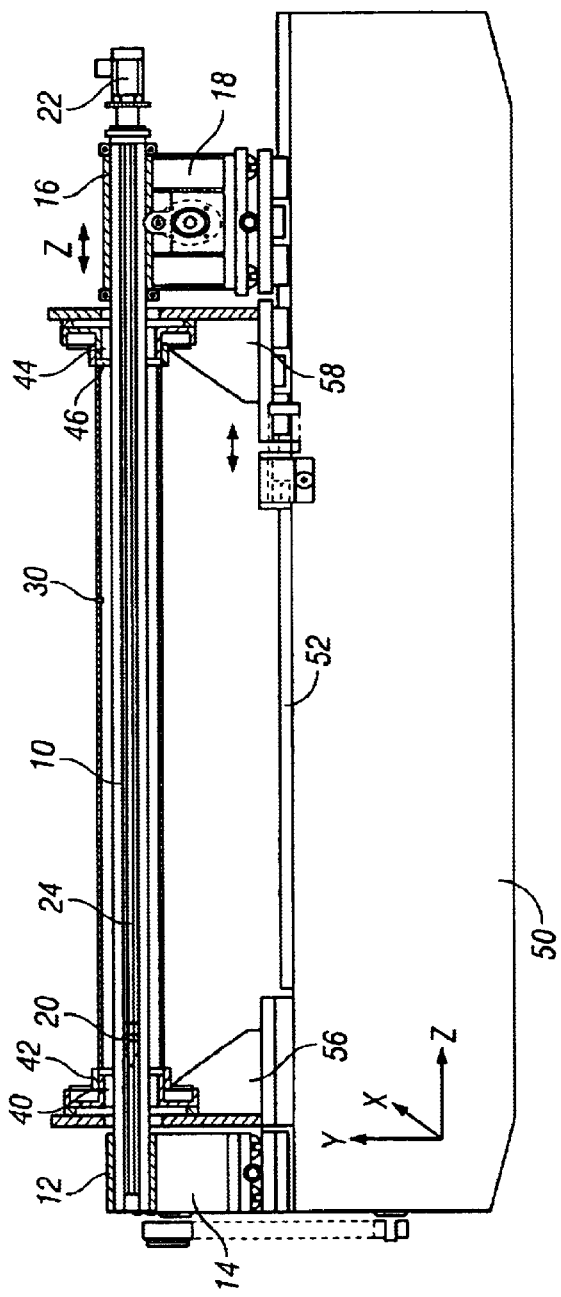
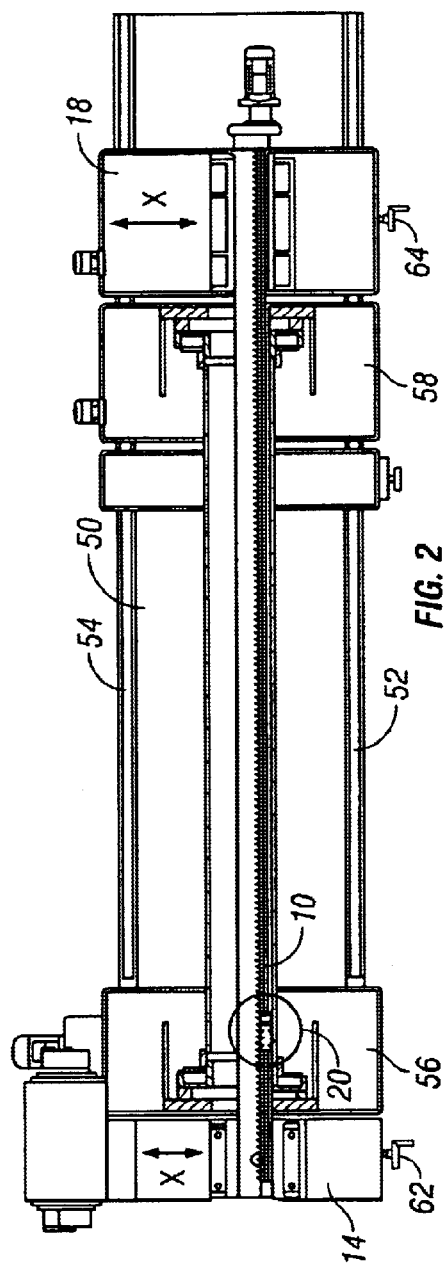

LATHE FOR INTERIOR CUTTING OF HOLLOW WORK PIECES

BACKGROUND

1. Field of the Invention

The present invention relates generally to turning lathe for interior cutting.

2. Background of the Invention

Commercial turning lathes usually machine hollow work pieces, in particular long hollow cylindrical work pieces, using boring rods. Differently constructed boring rods are available on the market. They are all gripped at one end leaving the machining of the work piece exposed. The maximum possible boring length for such boring rods is approximately 15 times the diameter of the boring rod. An unfavorable aspect ratio between length and diameter in the work piece results in the inability to perform interior turning tasks of longer lengths.

Furthermore, the tolerances achieved during interior turning of tubes by boring rods that have been gripped at one end and that are exposed are not acceptable. The desired surface roughness can no longer be achieved. Tube manufacturing tolerances, furthermore, cause tool vibrations when different depths of cuts are used, which then lead to an inadequate surface.

Therefore, the so-called deep-hole boring methods in which the boring head is guided are used for interior turning tasks of longer lengths. However, only cylindrical borings are possible in this connection allowing for a high quality surface finish and dimensional accuracy.

SUMMARY AND OBJECTS OF THE INVENTION

It is the object of the present invention to provide a turning lathe for interior cutting of hollow work pieces with which interior turning tasks of longer lengths of the work piece with low tolerances become possible.

This object is achieved by means of a turning lathe according to claim 1.

Preferred embodiments are detailed in the dependant claims.

In accordance with the invention the boring rod is gripped at both ends and held in place and the tool holder device is fitted onto the boring rod in such a way that it is movable. The tool holder device can then, in a controlled manner, move along the boring rod and perform the desired interior turning task.

Basically, it is possible to perform the interior turning task on a hollow work piece simply by making only the tool holder device movable leaving all other components, including the work piece, fixed. Preferably, the tool holder device is movable at least axially along the boring rod and is also operable radially in relation to the axis of the boring rod. However, the work piece can be held in the mechanism for holding a work piece in a manner that allows it to be rotated.

Another advantage of the mechanism for holding a work piece is the presence of detachable chucking systems with chucking heads.

It is preferable if an annular plate functions as the chucking head on every chucking system whereby the work piece is clamped in between the annular plates. It is particularly advantageous if the annular plates are truncated cone housings. This would allow for the machining of thin-walled work pieces. The truncated cone housing shaped annular plates hold the tubular work piece in place in an annular rotating manner and therefore in a perfectly circular manner.

The chucking systems or as the case may be the chucking heads and in particular the annular plates facilitate the rotational operation of the work piece.

At least one of the chucking heads of the work piece should be movable relative to the others so it can be adjusted to fit different lengths of tube.

It is furthermore advantageous to hold the boring rod in place on a boring rod sliding plate in such a manner that it is operable in longitudinal direction along its axis.

The boring rod can also be adjusted to move perpendicular to its axis so that for example slim truncated cone shaped bore holes can be made in tubular work pieces. By simultaneously controlling the boring rod sliding plates and the tool holder device as well as by taking advantage of the different possible settings, helix-like grooves, swellings, convex and other complex shapes can be achieved. Basically, the tool holder device is able to hold for example a lathe tool or geometrically undefined tools so that the turning lathe according to the invention also can be used as a grinder. In addition, a rotating tool can be attached to the tool holder device.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

BRIEF DESCRIPTION OF THE DRAWINGS

FIG. 1 shows a side view of an embodiment of the turning lathe in accordance with the present invention;

FIG. 2 shows a top view of the turning lathe from FIG. 1; and

DETAILED DESCRIPTION OF THE INVENTION

Figure 3:
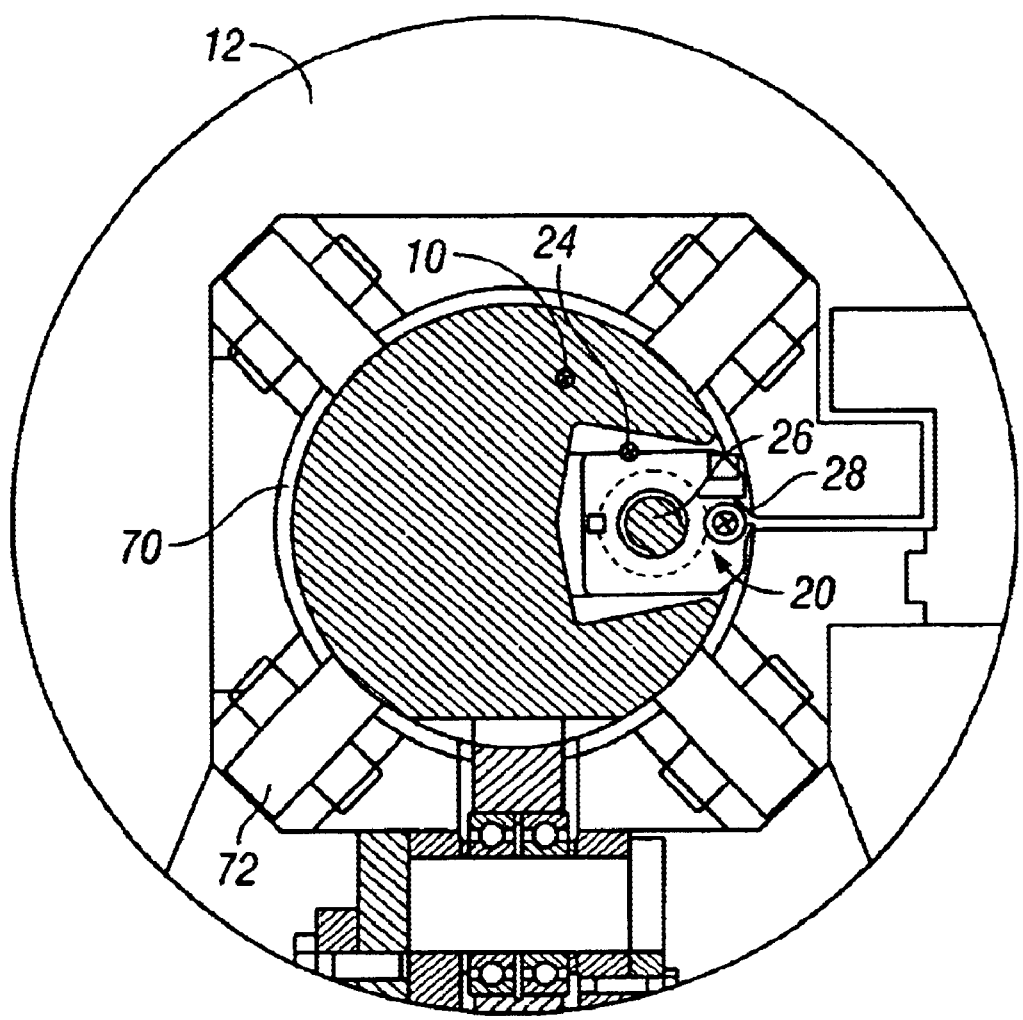
FIG. 3 shows a cross sectional detailed view of the position of the boring rod and the guiding of the tool holder device.

FIG. 1 shows an embodiment of a turning lathe according to the present invention, the key element of which is a boring rod (10) that is gripped, or as the case may be, mounted at both ends to a chucking head (12, 16), in other words, the boring rod (10) cannot be rotated about its axis. The chucking heads 12, 14 are fitted onto sliding plates 14, 18 so that the boring rod 10 can be operated in conjunction with the sliding plates 14, 18. The boring rod 10, for example, can also be adjusted to the x direction with the help of the sliding plates 14, 18 which is described in greater detail in connection with FIG. 2.

At least one of the sliding plates, in this case sliding plate 18 can be operated in z direction for assembly purposes, as is explained later. The boring rod 10 is fitted with a longitudinal guiding device 24 that basically extends over its entire length, in which a tool holder device can be moved back and forth in axial direction, in other words in the z direction. In this case, the tool holder device 20 is fitted with, for example, a sliding plate, not shown in FIG. 1, onto which a tool such as, for example, a lathe tool is held in place with the aid of a chucking device.

An electrical or mechanical feeding unit 22 for the tool holder device 20 is fitted onto one end of the boring rod 10.

The feeding unit 22 is infinitely adjustable. In FIG. 1 sliding plate 14 is stationary but, as is the case with sliding plate 18, could as easily be movable on one of the rail systems 52, 54 set up on a base section 50. This, in conjunction with the adjustment of the boring rod 10 to x direction, facilitates an array of possibilities for the manufacturing of geometry on the interior of hollow work pieces.

Between sliding plates 14, 18 there is a mechanism for holding a work piece 30, in this case a cylindrical tube that while enclosing the boring rod 10 is held in two chucking systems or chucking heads 40, 44. Chucking head 40 is fitted onto a stationary carrier 56 while chucking head 44 is fitted onto one of the carriers 58 that are operable on the rail system 52, 54 so that the mechanism for holding a work piece can be adjusted to differently sized work pieces. Each chucking head 40 or 44 is fitted with an annular plate 42 or 46 that is pushed against the work piece with pressure clamping the work piece 30 in between them. Each annular plate 42, 44 can be fitted with annular grooves that keep the edges of the tubular work piece 30 securely fastened. The annular plates can also be shaped like a truncated cone housing to facilitate automatic alignment of the work piece 30. The annular plates 42, 44 can quickly be interchanged and can therefore be adjusted to fit different diameters of the tubular work piece 30. The boring rod 10 runs through the central opening of the annular plates 42, 46 and further through an opening in every carrier 56, 58 that is basically aligned with the central opening.

When mounting a work piece 30 the boring rod 10 is firstly released from the chucking head 12 and moved outwards to the z direction with the help of the sliding plate 18. The changing of the tool occurs in such a manner that allows the tool changing to also be performed while the work piece 30 is gripped.

FIG. 2 shows how the boring rod 10 is adjusted to the x direction. Each sliding plate 14, 18 is fitted with a drive to allow for the movement of the sliding plate cars independently of each other in the direction of the double arrows designated by "x" so that the boring rod 10 can be directed onto the z-axis at a low angle or also, as is shown in FIG. 2, can be moved parallel to the z-axis so that the boring rod 10 lies during a cylindrical boring of the work piece 30; the sliding plates 14, 18 are adjusted differently when making slim truncated cone shaped bore holes in tubular work pieces 30. Finally, the cutting depth adjustment occurs by means of both boring rod 10 chucking heads 12, 16. The illustrated embodiment has a mechanical drive in the form of crank handles 62, 64.

FIG. 3 shows a cut-away view of a chucking head for example the boring rod 10 chucking head 12. The chucking head 12 has an axial boring 70 for the boring rod 10 whereby the outer perimeter of this boring 70 is fitted with four chucking bearing units 72 that hold the boring rod 10 in place so that it cannot twist. The boring rod 10 is fitted with a guiding device for the tool holder device 20 in the form of a channel extending on the outer perimeter, the depth of which has been adjusted to the tool holder device 20 in such a manner that a radial movement of the tool holder device 20 relative to the boring rod 10 is possible. The tool holder device 20 consists of a sliding plate 26 that is operable in the guiding device or as the case may be in the channel 24 and a tool-chucking device 28 that is attached to the longitudinal sliding plate 26 and that receives the machining tool.

The turning lathe according to the invention is equally suitable for metallic and non-metallic work pieces.

The invention specifications disclosed above and in the drawings as well as in the patent claims could be significant both individually and in any chosen combination for the different implementations of the invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A turning lathe for interior cutting of a hollow work piece, comprising:
   a boring rod defining a substantially longitudinal channel;
   a tool holder device including a tool-chucking device, the tool-chucking device residing at least partially within the channel; and
   a mechanism for holding the work piece whereby the work piece encloses at least a part of the boring rod,
   the boring rod being gripped at both ends for securing the boring rod, and
   the tool holder device being movably fitted to the boring rod.

2. The turning lathe of claim 1, wherein the tool holder device is at least axially movable along the boring rod.

3. The turning lathe of claim 1, wherein the tool holder device is radially movable relative to the axis of the boring rod.

4. The turning lathe of claim 1, wherein the work piece is rotatably fastened in the mechanism for holding a work piece.

5. The turning lathe of claim 1, wherein the mechanism for holding a work piece is fitted with detachable chucking systems each with a chucking head.

6. The turning lathe of claim 5, wherein every chucking system has an annular plate that functions as a chucking head whereby the work piece is clamped in between the annular plates.

7. The turning lathe of claim 6, wherein the annular plate is shaped as a truncated cone housing.

8. The turning lathe of claim 6, wherein the chucking systems and the annular plates can be operated in a rotational manner.

9. The turning lathe of claim 5, wherein at least one of the work piece chucking heads is movable relative to the other work piece chucking head.

10. The turning lathe of claim 1, wherein the boring rod is attached to at least one boring rod sliding plate in such a manner that the boring rod sliding plate can be operated longitudinally along the boring rod sliding plate's axis.

11. The turning lathe of claim 1, wherein the boring rod can be adjusted to move perpendicular to its axis.

12. The turning lathe of claim 1, wherein a portion of the channel closer to the perimeter of the boring rod is smaller than an interior portion of the channel.

13. The turning lathe of claim 12, wherein the tool holder device is rotatably movable within the channel.

14. The turning lathe of claim 1, further comprising a boring rod sliding plate located substantially within the channel.

15. The turning lathe of claim 1, further comprising a boring rod sliding plate located entirely within the channel.

16. The turning lathe of claim 1, wherein the tool holder device resides substantially within the channel.

\* \* \* \* \*